United States Patent
Gupta et al.

(10) Patent No.: US 8,448,114 B1
(45) Date of Patent: May 21, 2013

(54) METHOD FOR DUAL EDGE CLOCK AND BUFFER TREE SYNTHESIS

(75) Inventors: Deep Gupta, Barelly (IN); Puneet Dodeja, Delhi (IN); Pankaj K. Jha, Chandigrath (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/356,636

(22) Filed: Jan. 23, 2012

(51) Int. Cl.
*G06F 17/50* (2006.01)

(52) U.S. Cl.
USPC .............................. 716/114; 716/108; 716/113

(58) Field of Classification Search
USPC .......................................... 716/108, 113, 114
See application file for complete search history.

(56) References Cited

U.S. PATENT DOCUMENTS

| | | | |
|---|---|---|---|
| 5,604,680 A * | 2/1997 | Bamji et al. | 716/118 |
| 5,668,484 A | 9/1997 | Nomura | |
| 7,859,916 B2 | 12/2010 | Amirabadi | |
| 2005/0206419 A1* | 9/2005 | Kizer et al. | 327/158 |
| 2010/0102869 A1* | 4/2010 | Stoler et al. | 327/298 |
| 2012/0092051 A1* | 4/2012 | Erdogan | 327/158 |

\* cited by examiner

*Primary Examiner* — Vuthe Siek
(74) *Attorney, Agent, or Firm* — Charles Bergere

(57) ABSTRACT

A method for balancing both edges of a signal of an integrated circuit (IC) design includes defining a virtual cell to have the same geometry as that of a port of the IC design. First and second input pins of the virtual cell are defined for detecting rising and falling edges. The first and second input pin geometries are defined to be the same as that of the corresponding pins of the port. The virtual cell is overlapped with the port so the first and second input pins are connected to the corresponding port network. The first and second input pins are configured as sinks for clock and buffer tree synthesis. An EDA tool identifies the first and second input pins as additional parallel sinks on the port network and balances the rising and falling edges of the signal at the port.

19 Claims, 4 Drawing Sheets

METHOD FOR DUAL EDGE CLOCK AND BUFFER TREE SYNTHESIS

BACKGROUND OF THE INVENTION

The present invention generally relates to integrated circuit (IC) design and, more particularly, to clock and buffer tree synthesis, and balancing rising and falling edges of a signal during clock and buffer tree synthesis.

The design of electronic circuits is becoming increasingly complex due to shrinking sizes and increasing speeds. One design requirement is timing closure. Timing closure is a process in which a circuit design is modified to meet the timing requirements. Timing closure is achieved by balancing the rising and falling edges of signals in the circuit design at various stages of the circuit design process, such as clock tree synthesis, buffer tree synthesis, and timing optimization. Clock and data signals are balanced in these three stages to remove skew and latency.

Clock and data signals are balanced by optimizing signal paths using electronic design automation (EDA) tools. However, currently available EDA tools work effectively only in optimizing signal paths for the triggering edge of the signals, leaving the other edge unbalanced. Unfortunately, today's complex circuits sometimes now operate using both signal edges. Examples of circuits that use both edges of signals are double data rate (DDR) memory interfaces, latch based designs, and DDR debug interfaces. The differences in the characteristics of NMOS and PMOS devices results in asymmetry in delays in rising and falling edges in these circuit designs, and these differences need to be addressed separately because of the asymmetry. Thus, optimizing circuit designs only for the triggering edge of the signals offers limited results, especially in cases when the designs operate on both edges of the signals.

A few examples of circuit designs where balancing both edges of signals is important are shown in FIGS. 1-4. FIG. 1 is a schematic block diagram of a circuit design 100 that includes clock paths to an external double data rate (DDR) interface port 102. The circuit design 100 includes a clock driver 104 that supplies a clock signal to drive combinational logic 106. The output of the circuit design 100 is provided at the external DDR interface port 102. Both rising and falling edges of the clock signal need to be balanced because the DDR interface port 102 provides an output on both edges of the clock signal. If clock paths are optimized to balance only one edge, the skew at the other edge becomes inherent to the output.

FIG. 2 is a schematic block diagram of a circuit design 200 includes a clock source 202, a clock driver 204, combinational logic 206, output port 208 and sequential elements 210 and 212. The clock driver 204 supplies a clock signal to the combinational logic 206 and the combinational logic 206 outputs the clock signal to the output port 208, where it then is provide to the sequential elements 210, 212. Thus, the output port 208 acts as the clock source for the sequential elements 210 and 212. In this example, the sequential elements 210 are positive edge triggered and the sequential elements 212 are negative edge triggered. Thus, if the clock signal supplied by the output port 208 is not balanced for both the edges, there will be an inherent skew in the clock paths between the sequential elements 210 and 212.

FIG. 3 is a schematic block diagram of a circuit design 300 that includes a hard block 302. The hard block 302 includes a block port 304, positive edge triggered sequential elements 306, negative edge triggered sequential elements 308, and combinational logic 310. A clock driver 212 generates a clock signal that is provided to some external combinational logic 314 and the external combinational logic provides the clock signal to the block port 304. The block port then acts as a clock source for the sequential elements 306 and 308. If the clock signal at the block port 304 is not balanced for both edges, it will include an inherent skew for the clock paths between sequential the elements 306 and 308.

FIG. 4 is a schematic block diagram of a circuit design 400 that includes multiple external interface ports 410-416. The circuit design 400 includes data drivers 402 and 404 that provide data signals to corresponding combinational logic blocks 406 and 408, which in turn generate data signals that are available as output at the external interface ports 410-416. The data paths to the external interface ports 410-416 need to be optimized for latency and skew at the rising and falling edges to avoid timing and signal integrity (SI) violations.

FIG. 5 is a timing diagram representing an asymmetry in delays in rising and falling edges of a clock signal for the circuit design 300 of FIG. 3. The time period of the clock signal generated by the clock driver 312 is represented by Tp. The high period, i.e., the time period from a rising edge to the next falling edge is represented by Tr and the low period, i.e., the time period from a falling edge to the next rising edge is represented by Tf. For an ideal clock signal, Tr and Tf are equal. The clock signal received at the block port 304 includes asymmetric delays in the rising and falling edges due to non-optimized signal paths. As shown, the difference in delays in the rising and falling edges is delta ($\partial$), which decreases the high period to (Tr−$\partial$) and increase the low period to (Tf+$\partial$). As a result, the time period available for the timing path between sequential elements 306 and 308 is reduced from Tr to (Tr−$\partial$). Hence, the clock path needs to be modified or optimized so that the value of $\partial$ remains low, ideally zero.

Balancing both edges of the clock signal is crucial for the performance of a circuit design. As previously discussed, currently there is no optimal solution available for circuit designers to balance both edges. Designers often have to manually balance one edge using symmetric repeaters and symmetric combinational elements. This approach is difficult for many reasons. Firstly, this approach exacerbates asymmetry between the delay of rising and falling edges due to an increase in path lengths and numbers of combinational logic elements in the path. Secondly, manual balancing consumes a lot of time and requires multiple iterations. Thirdly, the results of manual balancing often result in poor quality of results (QoR).

Therefore, there is a need for a solution to balance the rising and falling edges of signals in circuit designs and to overcome the above-mentioned limitations of current EDA tools.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for balancing rising and falling edges of a signal of an IC design is provided. The signal is balanced at a port of the IC design during clock and buffer tree synthesis using an EDA tool. The IC design includes one or more logic paths for transmitting the signal to the port. The method includes defining a virtual cell having the same geometry as that of the port. Thereafter, first and second input pins of the virtual cell are defined for detecting rising and falling edges of the signal, respectively. The geometries of the first and second input pins are defined to be the same as that of the corresponding pins of the port. The virtual cell is overlapped with the port such that the first and second input pins are connected to a corresponding network of the port. The first and second input pins are configured as sinks for the clock and buffer tree synthesis. The EDA tool identifies the first and second input pins as additional parallel sinks on the network of the port, and as a result, the rising and falling edges of the signal are balanced.

Various embodiments of the present invention provide a method for balancing rising and falling edges of a signal of an IC design without introducing any additional timing or physical constraints on the IC design. The present invention is more efficient than conventional methods that use manual iterations and allows for good optimization. The present invention is not specific to any particular hardware descriptive language (HDL), EDA platform or tool and can be used with any EDA tool available in the market, such as Cadence® Encounter™ digital IC design platform, Integrated Circuit Compiler (ICC) by Synopsys, Inc., and Olympus SoC by Mentor Graphics, Inc.

Figure 1:
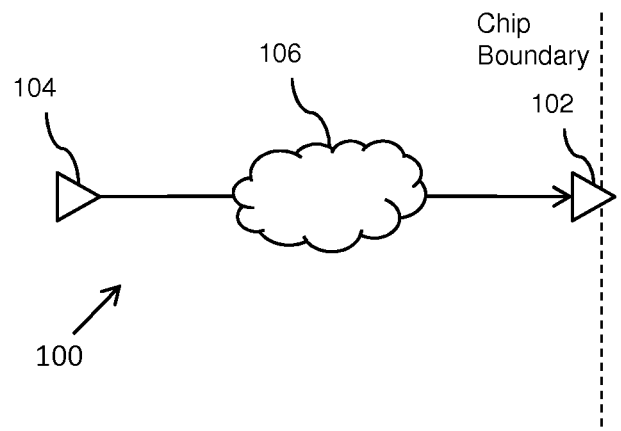
FIG. 1 is a schematic block diagram of a circuit design that includes clock paths to an external DDR interface port.
Figure 2:
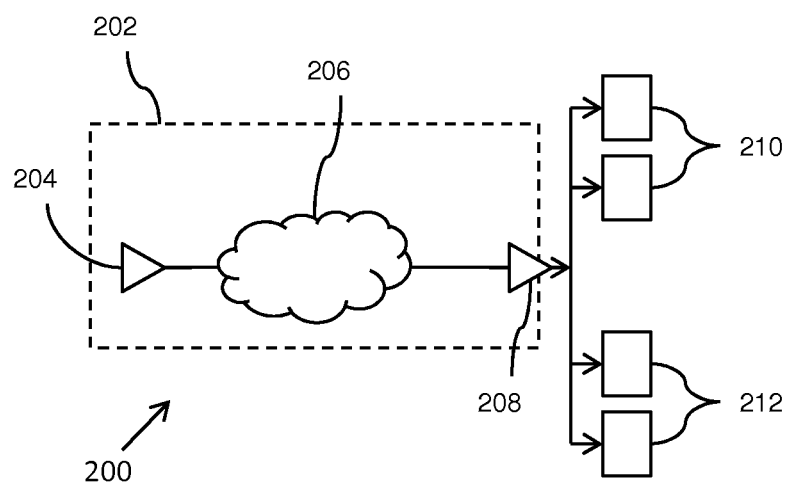
FIG. 2 is a schematic block diagram of a circuit design that includes a block that acts as a clock source for one or more sequential elements.
Figure 3:
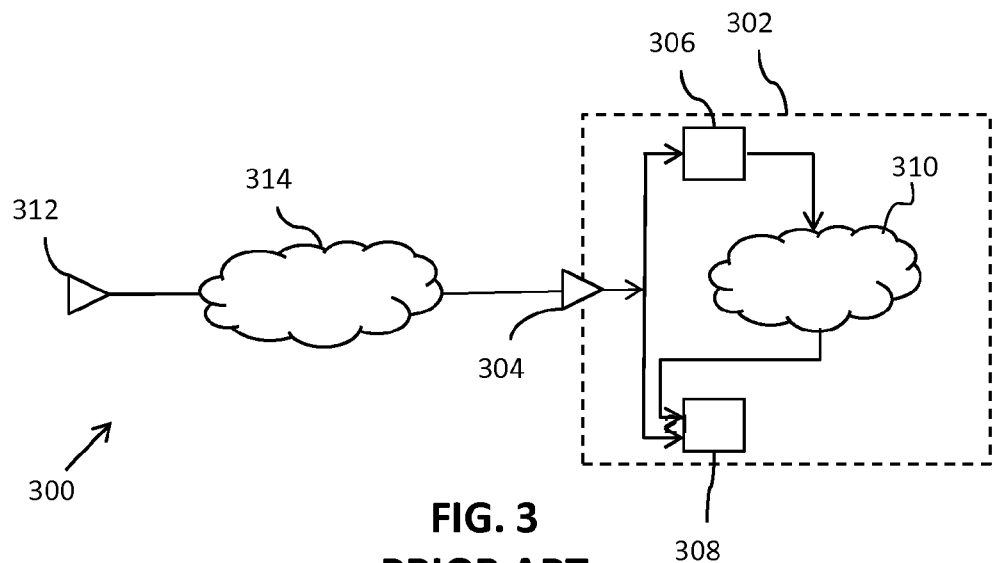
FIG. 3 is a schematic block diagram of a circuit design that includes a hard block.
Figure 4:
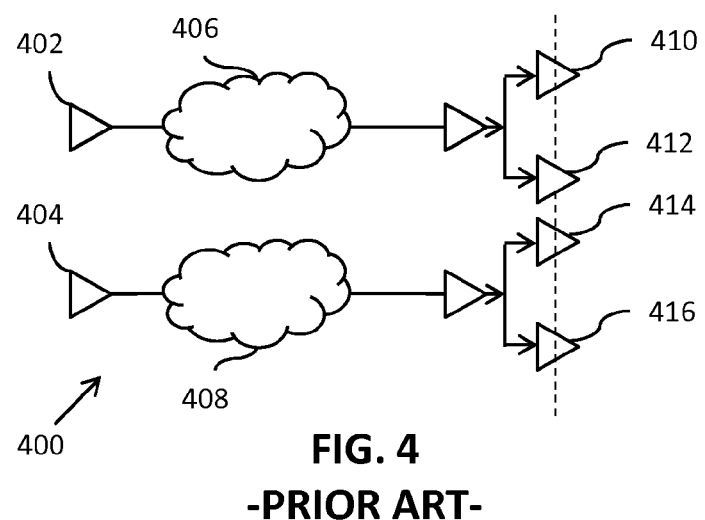
FIG. 4 is a schematic block diagram of a circuit design that includes multiple external interface ports.
Figure 5:
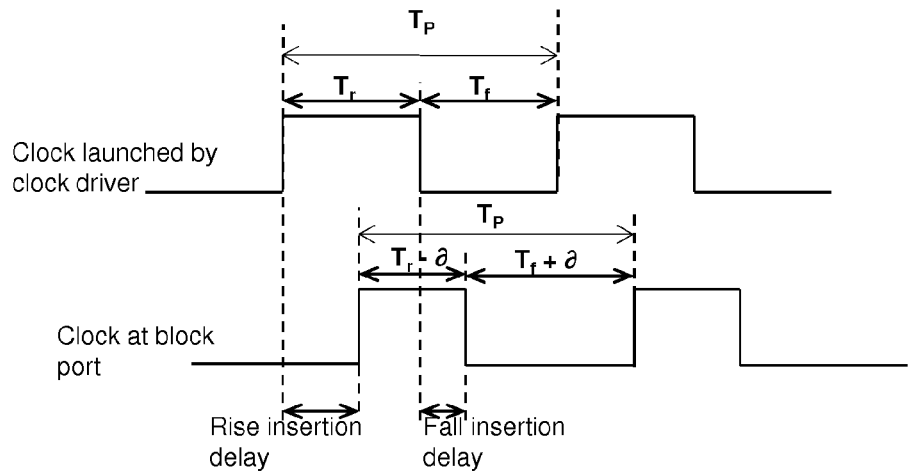
FIG. 5 is a timing diagram representing an asymmetry in delays in rising and falling edges of a clock signal of FIG. 3.

The present invention includes creating a virtual cell and configuring it in an IC design to balance the rising and falling edges of signals at a port of the IC design. The virtual cell is defined and configured such that an EDA tool detects both rising and falling edge paths on the port. A virtual cell is defined and configured at each port that is a hard block port or an input/output (I/O) port in the IC design. For example, the port may be an external DDR interface port 102 (FIG. 1), an output port 208 (FIG. 2), a block port 304 (FIG. 3) or an external interface port 410, 412, 414 and 416 (FIG. 4). The IC design includes various logic or signal paths for each port that needs to be optimized to balance the rising and falling edges of a clock or data signal. The logic or signal paths are hereinafter referred to as paths and the clock or data signal is hereinafter referred to as a signal. Also, as used herein, the term "hard block port" means the pin of an internal hierarchy that has been separately designed and then is placed and used in the IC design.

Figure 6:
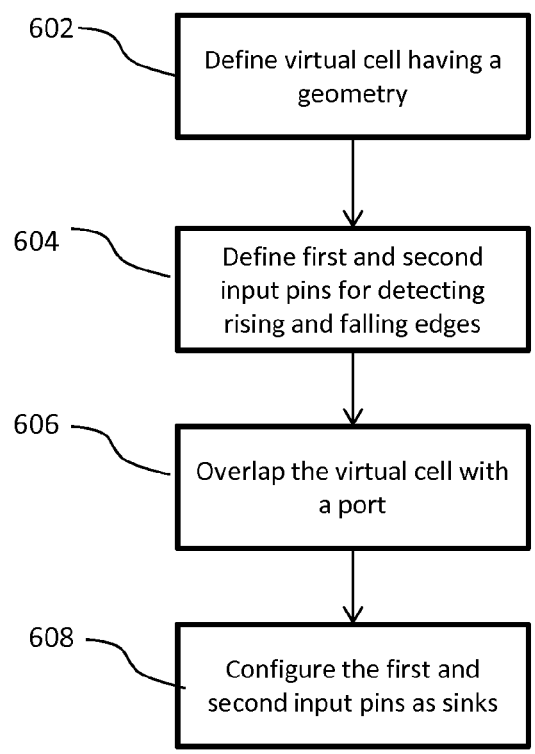
FIG. 6 is a flow chart illustrating a method for balancing the rising and falling edges of a signal in an integrated circuit design in accordance with an embodiment of the present invention.
Figure 7:
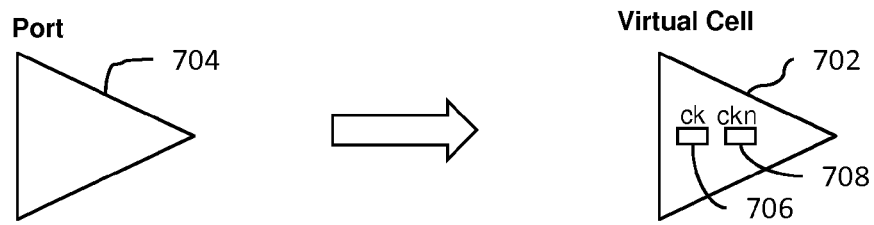
FIG. 7 is a schematic block diagram of a virtual cell and a corresponding port in accordance with an embodiment of the present invention.

Referring now to FIG. 6, a flow chart illustrating a method for balancing the rising and falling edges of a signal of an IC design in accordance with an embodiment of the present invention is shown. FIG. 6 is explained in conjunction with FIGS. 7 and 8. The method is performed during the design of an integrated circuit, such as a System on a Chip (SoC) at the stage in the design process after all the logic cells in the design have been placed. At such stage, the IC design is defined by, for example, a Verilog netlist, a physical placement information database, and cell libraries. At step 602, a virtual cell is defined such that the virtual cell has the same geometry as that of a port of the IC design. FIG. 7 is a schematic diagram of a virtual cell 702 and a corresponding port 704, in accordance with an embodiment of the present invention. The virtual cell 702 is created by replicating the geometry of the port 704. In an embodiment of the invention, the geometry of the port 704 is analyzed for size, shape, symmetry, layer and location. The virtual cell 702 then is designed to have the same size, shape, symmetry, layer and location as that of the port 704. Examples of tools that can be used to generate the virtual port 704 are Cadence® Encounter™ digital IC design platform, Synopsys Integrated Circuit Compiler (ICC), and Olympus SoC by Mentor Graphics, Inc., as previously discussed.

At step 604, two input pins 706 and 708 of the virtual cell 702 are defined. The input pins 706 and 708 are defined to have the same geometry as that of the corresponding pins (not shown in FIG. 7) of the port 704. In addition, the input pins 706 and 708 are defined such that the input pin 706 detects rising edges (ck) and the input pin 708 detects falling edges (ckn) of the signal. In an embodiment of the invention, the pin capacitances of the input pins 706 and 708 are defined to be zero and the virtual cell 702 is defined not to include any active elements of the IC design. The class of the virtual cell 702 is defined as 'COVER' to enable the virtual cell 702 to cover the port 704 during clock and buffer tree synthesis.

Figure 8:
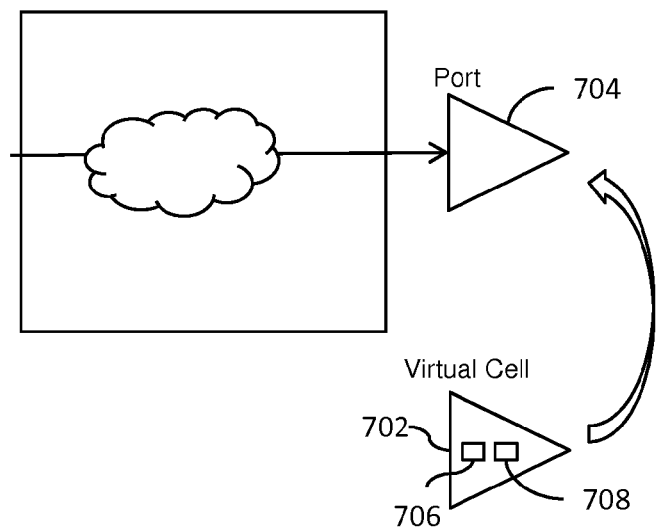
FIG. 8 is a schematic block diagram of the virtual cell of FIG. 7 overlapping a port in accordance with an embodiment of the present invention.

At step 606, the virtual cell 702 is configured in the IC design such that the virtual cell 702 overlaps the port 704. FIG. 8 is a schematic diagram showing the virtual cell 702 overlapping the port 704. The input pins 706 and 708 are connected to the network of the port 704 in a similar fashion as the corresponding input pins of the port 704 are connected. No extra routing resources are required for the virtual cell 702 as the geometry of the input pins 706 and 708 is the same as that of the corresponding inputs pins of the port 704, and the input pins 706 and 708 are connected by an abutment to the port 704. Also, no extra placement resources are required because the virtual cell 702 is placed such that it overlaps the port 704. The virtual cell 702 does not put any additional load on the network of the port 704.

At 608, the two input pins 706 and 708 are defined as sinks for buffer or clock tree synthesis. The EDA tool identifies the input pins 706 and 708 as two additional parallel sinks on the network of the port 704 during the buffer or clock tree synthesis. The two input pins 706 and 708 are configured to connect the network to the two input pins 706 and 708 in the same manner as the network is connected to the corresponding pins of the port 704 by instructing the EDA tool not to split the network into separate networks for the two input pins 706 and 708 and the port 704. The EDA tool identifies the input pin 706 as a rising edge sink and the input pin 708 as a falling edge sink and then optimizes the paths considering the requirements of the input pins 706 and 708. In other words, the EDA tool optimizes the paths for balancing both the rising and falling edges of the signal. The balancing of rising and falling edges of the port 704 is automatically taken care of since the port 704 and the virtual cell 702 are connected to the same network.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for balancing rising and falling edges of a signal of an integrated circuit design stored in a memory using an electronic design automation (EDA) tool executing on a processor, wherein the integrated circuit design includes at least one logic path for transmitting the signal to at least one port having a pre-defined geometry, the method comprising:
    defining a virtual cell having a geometry that is the same as the pre-defined geometry of the at least one port;
    defining first and second input pins of the virtual cell for detecting rising and falling edges of the signal respectively, such that the first and second input pins and corresponding pins of the at least one port have the same pin geometries;
    accessing the integrated circuit design stored in the memory and overlapping the virtual cell with the at least one port of the integrated circuit design such that the first and second input pins are connected to a corresponding network of the at least one port; and
    configuring the first and second input pins as sinks, whereby the EDA tool executing on the processor identifies the first and second input pins and corresponding pins of the at least one port as parallel sinks, thereby balancing the rising and falling edges of the signal.

2. The method of claim 1, wherein the signal is at least one of a clock signal and a data signal.

3. The method of claim 1, wherein the at least one port is one of an input-output (I/O) port and a hard block port.

4. The method of claim 1, wherein defining the virtual cell comprises analyzing the pre-defined geometry of the at least one port for shape, size, layer and location.

5. The method of claim 4, wherein the geometry of the virtual cell is defined such that the shape, size, layer and location of the virtual cell and the first and second input pins are the same as the shape, size, layer and location of the at least one port.

6. The method of claim 1, wherein the virtual cell is defined such that the virtual cell includes no active elements.

7. The method of claim 1, wherein the virtual cell is defined such that the first and second input pin capacitances are zero.

8. The method of claim 1, wherein the EDA tool is operated during clock and buffer tree synthesis of the integrated circuit design.

9. The method of claim 8, wherein the virtual cell covers the port during the clock and buffer tree synthesis of the integrated circuit design.

10. The method of claim 1, wherein configuring the first and second input pins comprises keeping a network connected to the first and second input pins of the virtual cell the same as the network connected to the corresponding pins of the port.

11. An EDA tool including at least one processor and at least one memory in communication with the processor, wherein the memory is used to store an integrated circuit design, the EDA tool for balancing rising and falling edges of a signal of the integrated circuit design, wherein the integrated circuit design includes at least one logic path for transmitting the signal to a port having a pre-defined geometry, the EDA tool performing steps including:
    defining a virtual cell having a same geometry as the pre-defined geometry of the port;
    defining first and second input pins of the virtual cell for detecting rising and falling edges of the signal respectively, wherein the first and second input pins and corresponding pins of the port have the same pin geometries;
    accessing the integrated circuit design stored in the memory and overlapping the virtual cell with the port such that the first and second input pins are connected to a corresponding network of the port; and
    configuring the first and second input pins as sinks, whereby the EDA tool executing on the processor identifies the first and second input pins and corresponding pins of the port as parallel sinks, thereby balancing the rising and falling edges of the signal.

12. The EDA tool of claim 11, wherein the steps are performed during clock and buffer tree synthesis of the integrated circuit design.

13. The EDA tool of claim 12, wherein the port is one of an input-output (I/O) port and a hard block port.

14. The EDA tool of claim 12, further including the step of analyzing the pre-defined geometry of the port for shape, size, layer, and location.

15. The EDA tool of claim 14, wherein the geometry of the virtual cell is defined such that the shape, size, layer and location of the virtual cell and the first and second input pins are the same as the shape, size, layer and location of the port.

16. The EDA tool of claim 12, wherein the virtual cell is defined such that the virtual cell includes no active elements.

17. The EDA tool of claim 12, wherein the virtual cell is defined such that the first and second input pin capacitances are zero.

18. The EDA tool of claim 12, wherein the virtual cell covers the port.

19. The EDA tool of claim 12, further comprising keeping the network connected to the first and second input pins of the virtual cell the same as the network connected to the corresponding pins of the port.

\* \* \* \* \*